United States Patent
Parthasarathy et al.

(10) Patent No.: US 8,191,048 B2
(45) Date of Patent: May 29, 2012

(54) AUTOMATED TESTING AND QUALIFICATION OF SOFTWARE-BASED, NETWORK SERVICE PRODUCTS

(75) Inventors: Mukundan Parthasarathy, Cupertino, CA (US); Richard J. Ambridge, Cowes (GB)

(73) Assignee: Oracle America, Inc., Redwood City, CA (US)

( * ) Notice: Subject to any disclaimer, the term of this patent is extended or adjusted under 35 U.S.C. 154(b) by 859 days.

(21) Appl. No.: 12/275,913

(22) Filed: Nov. 21, 2008

(65) Prior Publication Data
US 2010/0131928 A1    May 27, 2010

(51) Int. Cl.
G06F 9/44    (2006.01)
G06F 3/00    (2006.01)

(52) U.S. Cl. ......... 717/126; 717/124; 719/313; 719/318
(58) Field of Classification Search .......... 717/124–135; 714/37, 38.1; 719/313–318
See application file for complete search history.

(56) References Cited

U.S. PATENT DOCUMENTS

| | | | |
|---|---|---|---|
| 6,301,701 B1* | 10/2001 | Walker et al. | 717/125 |
| 6,859,922 B1* | 2/2005 | Baker et al. | 717/125 |
| 7,353,497 B2* | 4/2008 | Maresca et al. | 717/124 |
| 7,519,953 B2* | 4/2009 | Reissman et al. | 717/124 |
| 7,698,603 B2* | 4/2010 | Staneff | 714/45 |
| 7,877,732 B2* | 1/2011 | Day et al. | 717/124 |
| 2002/0087372 A1* | 7/2002 | Maresca et al. | 705/7 |
| 2004/0015846 A1* | 1/2004 | Haisraeli | 717/115 |
| 2005/0071818 A1* | 3/2005 | Reissman et al. | 717/127 |
| 2008/0126390 A1* | 5/2008 | Day et al. | 707/102 |
| 2008/0201098 A1* | 8/2008 | Manfredi | 702/108 |
| 2009/0070633 A1* | 3/2009 | Staneff | 714/45 |

OTHER PUBLICATIONS

Caldiera et al., "Identifying and Qualifying Reusable Software Components," Feb. 1991, IEEE, p. 61-70.*

* cited by examiner

Primary Examiner — Wei Zhen
Assistant Examiner — Qing Chen
(74) Attorney, Agent, or Firm — Marsh Fischmann & Breyfogle LLP; Kent A. Lembke (57) ABSTRACT

A computer-based method for qualifying a software application such as a monitoring and/or management network-delivered product. The method includes operating a computer to run a software application with network-delivered services. A qualification computer system is provided with a code generator adapted for processing device qualification data and with a comparator module. The method includes generating a set of event messages with the code generator by processing a set of received or retrieved device qualification data. The event messages are processed with the services or serviceability features of the software application to generate a set of output. With the comparator module, the actual output is compared with expected output for the event messages. Based on the comparison, a qualification report is generated, and the expected output may be output from unit test cases. A code generator may be included that generates one or more native protocol event generators.

16 Claims, 3 Drawing Sheets

AUTOMATED TESTING AND QUALIFICATION OF SOFTWARE-BASED, NETWORK SERVICE PRODUCTS

BACKGROUND OF THE INVENTION

1. Field of the Invention

The present invention relates, in general, to methods and systems for testing and qualifying software tools and applications such as those used to provide hardware and/or software service products including network-based monitoring applications, and, more particularly, to methods automating the testing and qualification of applications, tools, routines, and the like such as software programs or plug-ins/add-ons developed to provide new hardware or software serviceability or other features to network monitoring tools/applications that may be provided via a network delivery model.

2. Relevant Background

Software testing is used to provide developers and purchasers of a new product or features being added to an existing software product with information about the quality and effectiveness of the product or service. The product is preferably tested or qualified for use in the context in which it is intended to operate such as within a similar computer system or network with similar operating conditions including similar running software applications, similar hardware devices such as servers, data storage devices and configurations, and communications components or networking devices. Customers or users of new products want assurances that a new product or upgrades to an existing software service have been adequately tested and will not cause their system to crash or even result in degradations in the system or device operations.

Testing cannot completely establish the correctness of a new software product or added feature of an existing application, but it instead typically provides a comparison of the state and behavior of the software product with standards such as comparable products, prior versions of the product, and customer or user expectations for the product. The primary purpose of testing is to detect software failures so that defects may be uncovered and corrected, but this has become more difficult with the increasing complexity of software products and the systems or networks in which the software products are used. Testing or qualification of software products or added features is also used to determine whether the product or new features are compatible with other applications, operating systems, and hardware of the system running the product or using the new features.

Testing or qualifying software products is further complicated when the software product is adapted to provide services over or within a network (e.g., services are provided based on the network delivery model). It is often difficult to replicate a typical customer's or user's data center or distributed computer network in a controlled or laboratory setting, e.g., a test lab with identical computer devices, similar storage configurations, and networking devices linking these components including running applications and operating systems. The option of running the new software product on the customer's system for qualification is also generally not an option as the user wants the product to be tested or proven before loading onto their system.

The information technology industry has, for example, developed management software or suites of application that may be used to monitor and manage operation of a data center, data storage array or system, or other computer system. For example, Sun Microsystems, Inc. provides array management software including an Auto Service Request (ASR) feature or module that monitors the array system health and performance (e.g., based on telemetry collected operating data from the customer's system components) and automatically provides notifications when critical events occur (e.g., generates an automatic Service Request case upon a critical alarm that is transmitted to a support or monitoring center). Such monitoring and management tools may be thought of as providing support services or serviceability features via a network or by a network delivery model, and these tools have been very popular with owners of large computer systems such as data centers for monitoring operation of storage devices and even for monitoring and controlling power usage. A drawback of such network delivered services is the complexity and difficulty of testing new products or even adding new features or services to these management applications.

Providing product support services for servers, storage, software, and so on requires a qualification process for each product or added feature prior to delivery. The new hardware or software "serviceability" features or service products may be provided across such attributes as power consumption, component faults, component or environment monitoring, or even user-specified operating parameters. Presently, there is little or no automation around the network service delivery software that is written to facilitate testing of remote services or features such as automated case creation, power analysis predictions, and so on that may monitor using telemetry or the like. As a result, existing testing and qualification is an expensive and time-consuming process that may even produce incomplete results (e.g., when a user's system is not adequately replicated in a lab setting).

There remains a need for methods for qualifying network-delivered services and other similar software products. Preferably such a qualification method would address the need to test or qualify network-delivered services that may include automated service request creation or other monitoring outputs/alarms/alerts such as those created upon observation of hardware component faults, power monitoring, event monitoring, and other monitoring of storage, servers, and service offerings such as MySQL, GlassFish, and the like. For example, it is desirable to provide a qualification method for speeding up the process of providing new hardware or software serviceability features for a network monitoring or similar application that reduces field costs and delays in delivery of support offerings to the marketplace).

SUMMARY OF THE INVENTION

Briefly, the above and other issues with testing and/or qualifying software applications especially those with network delivered features and services addressed with qualification methods of the present invention that may be labeled or thought of as "service qualification processes." The qualification methods provide generic, extensible, and platform independent mechanisms of leveraging device qualification data to speed up qualification/testing and delivery of web-based, remote service offerings. The use of device qualification data as described herein facilitates automated and exhaustive testing of product serviceability features of new software products or new features being added to existing software applications (such as data center or data storage monitoring and management software applications, tools, or suites), and these features may include fault management features, power management features, and other services such as device or software module availability monitoring. Use of the qualification processes of the invention facilitates delivery of cost-optimized network service products in a timely manner with a higher level of assurance that these software-based products have been fully tested to verify consistent and high quality features and operability.

More particularly, a computer-based method is provided for qualifying a software application such as a monitoring and/or management product that provides monitoring and/or management services over a communications network. The method includes operating a computer, which is communicatively linked to a network such as the Internet, a LAN, a WAN, or the like, to run or provide a software application with a plurality of network-delivered services. A qualification computer system is also linked to the network to be able to communicate with the software application being tested/qualified, and the qualification system includes a code generator adapted for processing device qualification data and also includes a comparator module. The method continues with generating a set of event messages with the code generator by processing a set of received or retrieved device qualification data (e.g., data encoded in spreadsheets for use in injecting errors into a monitoring or management application by simulating telemetry or other data from servers, storage, and other devices typically monitored by the software application in normal use). The event messages are processed with the services or serviceability features of the software application to generate a set of output ("actual output"). With the comparator module, the set of actual output is compared with a set of expected output for the event messages. Then based on the comparison, a qualification report (which may include or be the actual output) is generated and, in some cases, delivered to a testing monitor (or GUI) or an output device.

In some cases, the set of expected output is output from a set of unit test cases, which processed or used similar or the same event messages. A code generator may also be included that generates one or more native protocol event generators, and the method may include generating a set of events in a protocol native to one or more of the services of the software application (based on the device qualification data, for example). The qualification system may also include a set of device simulators that operate to generate environment enrichment data simulating a number of devices (such as servers, storage devices, and the like), and the software application processes this environment enrichment data (e.g., simulated device data) as part of processing the event messages or separately to create the set of output that is compared with expected output from previously prepared test cases.

BRIEF DESCRIPTION OF THE DRAWINGS

FIG. 2 illustrates a functional block or schematic diagram of a service qualification process of an embodiment of the invention such as may be implemented during operation of the system of FIG. 1 and as may be used to test or qualify a network delivered monitoring/management application or tool such as the Auto Service Manager available from Sun Microsystems, Inc. or the like.

DETAILED DESCRIPTION OF THE PREFERRED EMBODIMENTS

Briefly, embodiments of the present invention are directed to methods and systems for providing service qualification with automated and manual steps. The service qualification methods and systems are adapted to allow a software product such as a monitoring application to be tested by validating and/or simulating a list of supported hardware products such as servers, storage devices such as arrays, host devices running particular operating system, and the like without the need for a hardware lab, as was required with prior qualification processes (e.g., simulation of a data center to test a monitoring application with service features for particular hardware required replication of the data center with identically operating hardware products). The qualification process is particularly well suited for network-delivered services that are more difficult to test or qualify in a lab setting.

Figure 1:
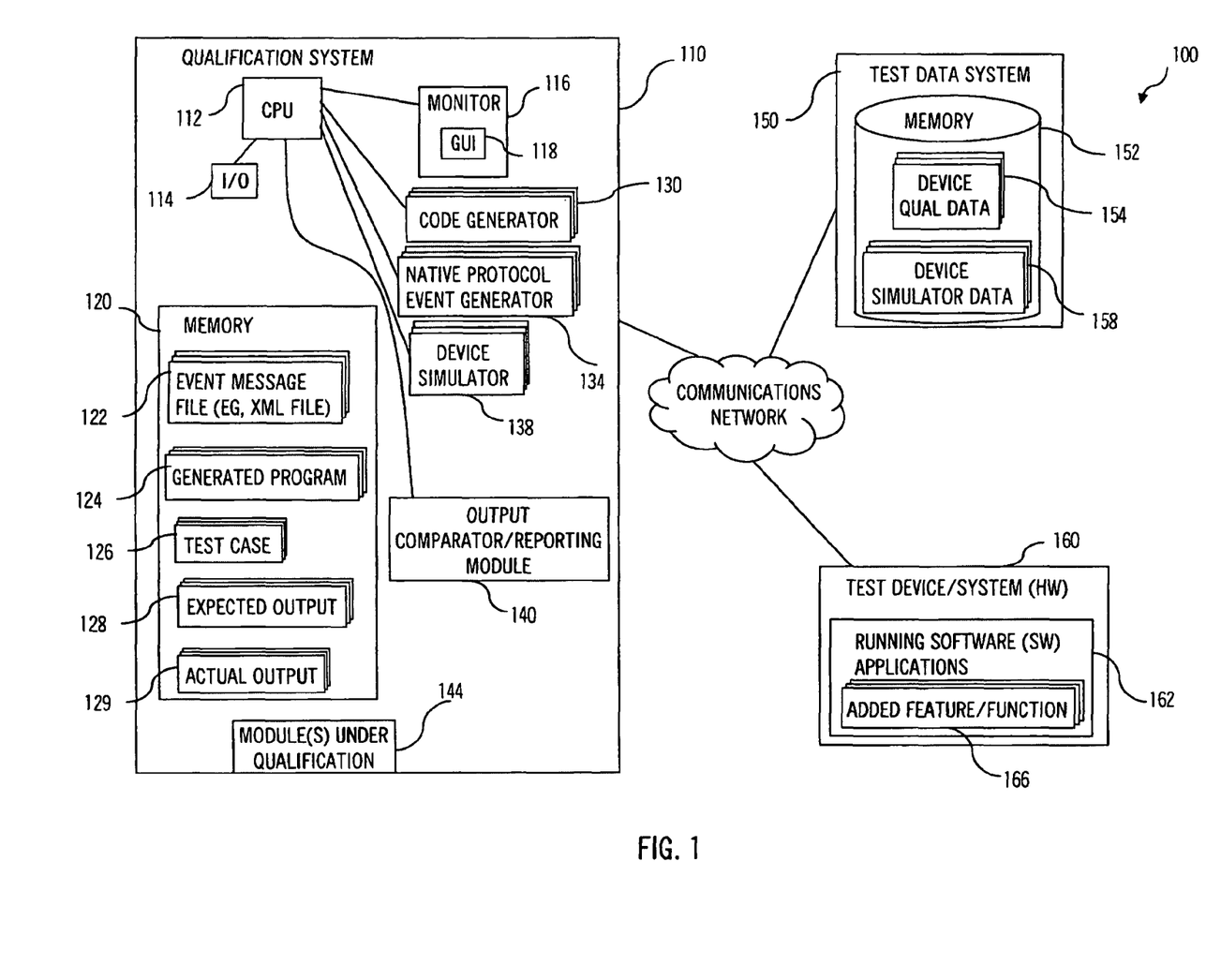
FIG. 1 illustrates a functional block diagram of a computer system or network configured to operate as or provide a computer-based process for qualifying software application (e.g., a qualification or testing network with a computer system or node operating as a qualification system or device)

FIG. 1 illustrates an exemplary software or service product testing network or system 100 useful for implementing aspects of the invention. The testing system 100 replaces a large lab with numerous hardware devices replicating the computing or use environment for a particular software application or service product. In this example, the testing system 100 includes a qualification system or device 110 in digital communications via communications network 104 (e.g., the Internet, an intranet, a LAN, or the like) with a test data system 150 and a test device/system 160. The qualification system 110 is a device adapted for supporting a service qualification process as described below with reference to FIGS. 2 and 3 while test data system 150 (which may be a part of system 110) functions to provide device qualification data 154 and device simulation data 158 stored in memory 152 to the qualification system 110. The test device or system 160 is included to run the software application or suite 162 that is being tested or qualified (e.g., a version of Sun's Auto Service Manager with new service features, a monitoring/managing application using telemetry data, a power management product, and/or the like) with, in some cases, added features or functions 166 (e.g., qualification processes are performed to determine the effectiveness and compatibility of newly added services). In this example, the software application 162 being tested will typically be run on a system or computing device similar or, preferably, identical in configuration and design as will be used by a user or customer to better simulate the context or environment for the application 162 (e.g., similar host device with a particular operating system and network communications via network 104).

Each of the systems 110, 150, 160 may be implemented a variety of computers or computing devices typically adapted with one or more processors managing operation of input/output devices and memory and running software modules or programs that may be provided via computer-readable medium adapted to cause a computer or the systems 110, 150, 160 to perform the functions described herein. In this discussion, computer and network devices, such as systems 110, 150, 160 are described in relation to their function rather than as being limited to particular electronic devices and computer architectures. To practice the invention, the computer devices and network devices may be any devices useful for providing the described functions, including well-known data processing and communication devices and systems such as desktop computers, and even personal digital assistants, personal, laptop, and notebook computers with processing, memory, and input/output components, and server devices configured to maintain and then transmit digital data over a communications network. Data, including device qualification data, device simulation data, event messages/files simulating device operations in response to device qualification data, and transmissions to and from systems 110, 150, 160 is typically communicated in digital format following standard communication and transfer protocols, such as TCP/IP, HTTP, HTTPS and the like, but this is not intended as a limitation of the invention.

Figure 2:
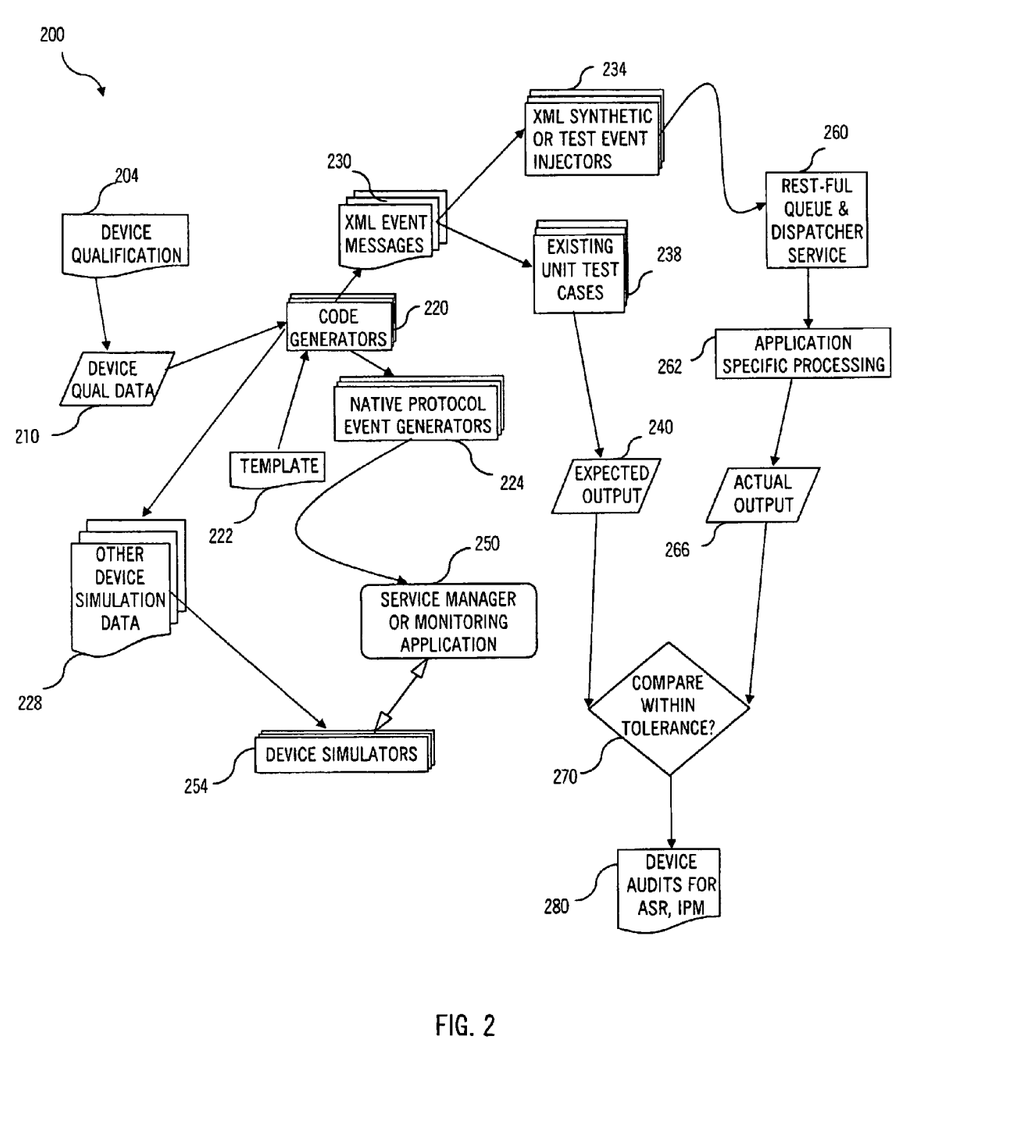
Figure 3:
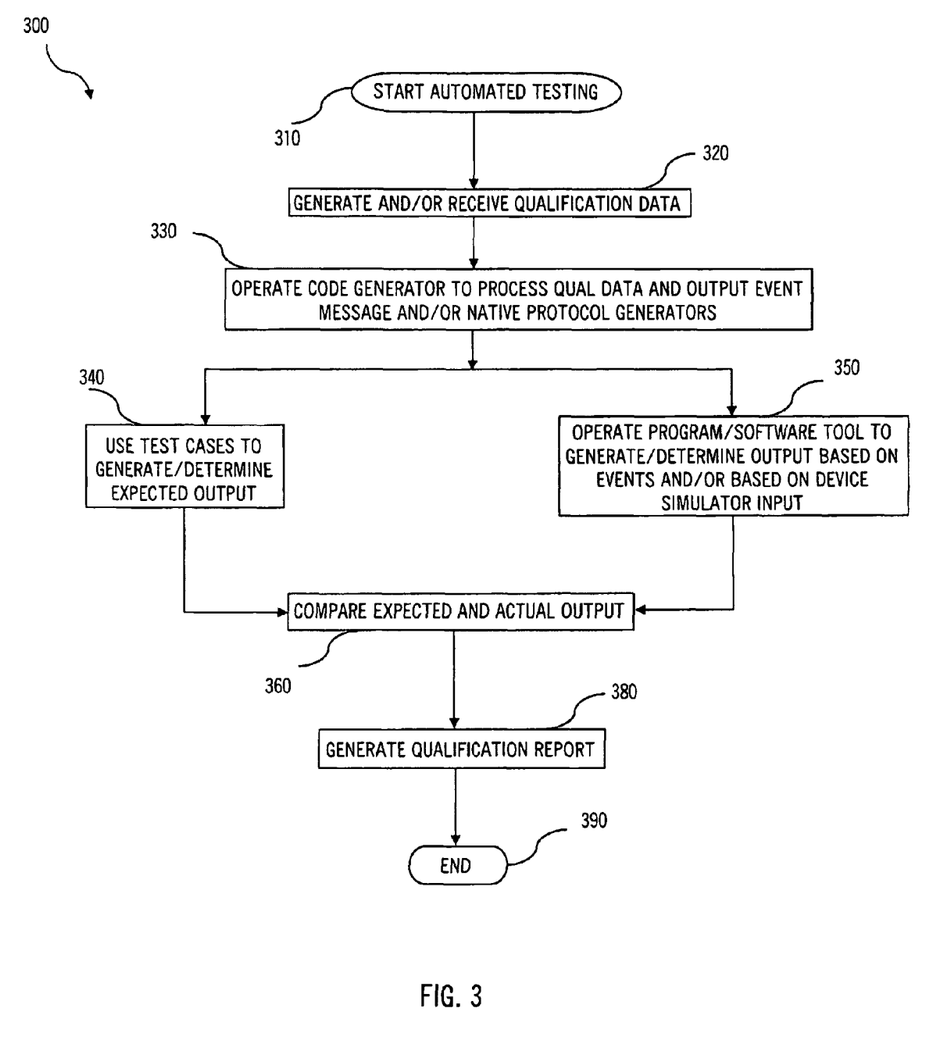
FIG. 3 is a qualification process for testing a software product or features of an application using device qualification data to automate at least portions of the qualification process.

The qualification system 110 includes a processor 112 managing operation of I/O devices 114 that allow an operator to enter data/input such as to select a software application 162 to test and to select/retrieve device qualification data 154 for use in service qualification processes (see FIGS. 2 and 3 for example). The processor 112 also manages operation of a monitor 116 to provide or display output such as qualification reports based on a comparison of actual outputs and expected outputs of tested features/services 166 of the tested software 162 and/or to display or output the actual output of the tested service products 162 and/or 166 such as by displaying device audits for a device monitoring application 162 (e.g., a service manager, a power manager, or the like). Other output devices may be included in the system 110 such as printers or data storage devices such as disks or pluggable memory devices such as USB sticks or the output of the qualification method or process may be transferred over the network 104 to other devices.

The qualification system 110 includes one or more code generators 130 that are adapted in some embodiments to process device qualification data 154 for devices (e.g., hardware and/or software devices) that are serviced or interacted with by the tested software application 162 or its features/services 166. The output or product of the generators 130 may be event messages 122 that are then stored in memory 120 for use in testing the software 162 or it may include generated programs or code 124. The generated code 124 may be used by the CPU 112 to provide native protocol event generators 134 and/or to provide device simulators 138. In other cases, the event generators 134 and/or device simulators 138 may be provided separately or as pluggable components that can generate events or simulate devices. For example, device simulation data 158 may be fed to or retrieved by the CPU 112 for processing by the device simulator to create a more accurate operating environment for the tested software application 162 (which may also be run on the qualification system 110 as one or more modules 144 under qualification processes). Note, also, that one or more programs/routines (not shown) may be run by processor 112 to act as a qualification engine coordinating operation of the various components such as the code generators 130, the event generators 134, device simulators 138, and output comparator/reporting module(s) 140 (e.g., to control flow of the process as described with reference to FIGS. 2 and 3).

The system 110 also includes test cases 126 such as JUnits or the like for providing expected output 128 based on a set of event message files 122 or other test input/payload used in qualifying the software application 162 (e.g., event messages are shown in FIG. 1 but other inputs or data may be used to test a particular software application 162 and its services 166). The actual input 129 stored in memory 120 is generated by application specific processing by the running software application 162 (or modules 144) when it processes or responds to generated test input 122 and/or based on operations/outputs of device simulators 138 (e.g., a data storage monitoring application 162 may receive an event or alarm and then operate to monitor/manage a device simulated by one or more of the simulators 138). The qualification system 110 includes an output comparator and reporting module 140 that acts to compare the expected output 128 from an event or test input 122 with the actual output 129 produced by the software application 162 or its service products/features 166. The reporting module 140 may then output a qualification report (such as via GUI 118 or a printer or the like) and/or provide the actual output 129 "as is" and/or with notations indicating identified differences with expected output 128 (or results of the comparison).

FIG. 2 illustrates schematically a service qualification process 200 of an embodiment of the invention such as may be provided by operation of system 100 of FIG. 1. The process 200 is particularly well suited for use in qualifying or testing of software applications that include network-delivered services and/or that are difficult to simulate in lab settings such as a service manager or monitoring application 250 that may be used to monitor/manager storage, a data center, a customer's computer system/network, and so on (e.g., to test services or features being added to storage or network management applications such as the Sun Auto Service Manager or the like). The service qualification process 200 includes both automated and manual steps. The automated steps implemented by software programs or code include code generators 220, the tested application 250, the device simulators 254, the queue and dispatcher service 260, and the comparing mechanism 270. The process 200 scales to qualifying new services with the application 250 under qualification or testing often being an extensible platform for adding new functionality.

Generated code and test artifacts 224, 230 are used for testing in both a service-oriented architecture (SOA) and/or web-based environments as well s with native protocols germane to the specific type of service 250 (e.g., Simple Network Management Protocol (SNMP) such as for testing of the Sun Auto Service Request (ASR) service or the like, Telnet such as for testing of Sun's Intelligent Power Monitoring (IPM) service or the like, and so on). The qualification process output 280 may be generated as an automated report that includes information that helps testing personnel and/or designers of the software 250 to verify the functional correctness of various network service products in a matter of hours instead of requiring days or weeks of testing. For example, the process 200 has been used with or for the software-based ASR solution, and the framework or process 200 has been used to qualify more than 30 server products and a few storage systems covering over 3000 SNMP alarms in less than 3 months. The process 200 may be used to qualify software for use with various hardware/software devices such as servers and storage systems but may also be used networking hardware, and software applications such as MySQL products, GlassFish services, and the like.

In the process 200, device qualification information 204 is processed to create a set of device qualification data 210 that is configured for use as input to one or more code generators 220. The device qualification data 210 may be arranged in comma separated value (CSV) files, include representative time-series data, provide event "replay" data captured during manual testing/qualification processes, and/or other data that is typically representative of normal and/or abnormal operation of a set of devices (e.g., data encoded in spreadsheets or the like that may be used to inject operating errors for which monitoring/management software 250 is intended to detect or monitor for). The idea or function of the device qualification data 210 is to capture data pertaining to certain serviceability aspects or functions of the device(s) such as component faults, power consumption profiles, certain performance or resource metrics crossing a predefined threshold (e.g., that should cause an event or alarm). Also, such captured data 210 from qualifications 204 can be supplemented by human/manual and/or subjective data such as an experts determination of actions to be taken (e.g., data value over a threshold should trigger notification, certain data value should signal a critical fault, or other data).

It may be useful at this point to provide one working example of device qualification data 210 that may be used in the qualification process 200. The device qualification data 210 may be presented according to a CSV schema for server or storage systems such as by using Sun's Fault Management Architecture (FMA) or other tool. The following is an example of such schema for data 210 in which each column is separated by a "|" character: #MSG_ID|HW_PLATFORM| COMPONENT| TRANSLATED_TEXT (SUMMARY) |DESCRIPTION|SEVERITY| SOURCE_OF_INFO. This format would, of course, be different for other network or tested services. For example, for Intelligent Power Monitoring (IPM) services, the qualification data 210 may include power characteristics/profile data with time series for each hardware product type. The process 200 is extensible or adaptable in part because the qualification 200 will vary based on the input or utilized device qualification data 210 that may be provided or modified by parsers that implement different formats.

In the process 200, code generators 220 such as an extensible code generator (written in Perl or other language) takes the device qualification data 210 as input in various formats to produce native protocol event generators (e.g., generators creating events in SNMP for SunMC and FMA or other protocols) and/or event messages 230. In one embodiment used to qualify services 250 for use in server systems, the code generator 220 takes CSV files as part of the qualification data 210 for fault detection agents. This allows "pluggable" components to be used for generators 220 that can generate "virtual" device simulation programs 224. In some cases, other device simulation data 228 (e.g., event enrichment information, time series, and the like) is provided or generated by code generators 220 for use by or as input to device simulators 254 in the form of matching device response and/ or event data "enrichment" files 228. The generated artifact 228 for ASR qualification may have the following format (with "|" separated columns): OID|Event UUID| attributeName|attributeValue| . . . |ProductType| Component|. To facilitate operation of the code generators 220, template files 222 may be used for creating the native protocol event generators 224. For example, for ASR qualification, this would facilitate simulating faults grouped by components within a server or storage system, simulating faults grouped by product type, and so on.

The messages 230 generated by code generators 220 from qualification data 210 may be event messages and may take the form of common format eXtensible Markup Language (XML) files. For example, a single XML schema file may be chosen or designed that accommodates a large set of fault telemetry (i.e., fault telemetry to cover storage, server, or software system events) or types of telemetry payload. The event messages may relate to one or more hardware and/or software devices with an identification of such devices along with information on the error or event such as describing a particular error that has been detected (e.g., a correctable error, an uncorrectable error that is fatal or non-fatal) such as a trap with an event identifier, type, and/or other information related to the event or device.

The programs 224 that are generated by the code generators 220 may be adapted to talk the "native" protocol such as SNMP (e.g., when the application 250 is an ASR service), Telnet (e.g., when the application 250 is an IPM service), or the like, with the particular protocol used for communications by the event generators (e.g., events are issued to the application 250 in a protocol it understands) being adjustable by use of templates 222. In general, the event generators 224 act to transmit events for one or more hardware and/or software devices. The events may take many forms depending upon the application 250 being qualified but may include traps (major, critical, and so on) or other event/alarm triggers and are issued or communicated in a native protocol to the service manager or monitoring application 250 based on the device qualification data 210 (e.g., the data 210 may include information that is processed by the generators to determine whether or not to transmit an event and when to transmit such an event (or the transmittal time may be determined by the generator such as sequentially transmitting events, randomly sending the events over a particular qualification time period, and so on)).

As shown at 234, a set of "normalized" events are produced from (or as a subset of) the event messages 230 that can be used to qualify or test the service manager or monitoring application 250. For example, the events 234 may be XML formatted events that are amenable to HTTP as payload and are adapted for being directly injected over the Web or network into web-hosted service points in manager/application 250. As shown, the events 234 are XML "synthetic" or test event injectors (e.g., custom event injectors or events created using conventional testing tools such as JMeter or the like as these may be useful for processing output 230 of the code generators 220 to create synthetic event messages and act as a load testing tool for analyzing and measuring the performance of a variety of services or features of the application 250 (e.g., may be used as a unit test for database connections or other connections such as FTP, LDAP, Web services, JMS, HTTP, and generic TCP connections).

At 238, the event messages 230 provided by the code generators 220 may be used in configuring a set of existing test cases such as unit test cases provided via the JUnit or other unit testing framework. The Unit test cases 238 may be called or run to provide expected output 240 (e.g., with the use of a JUnit test, one can ascertain the ability of the application code of service manager or monitoring application 250 to properly achieve a desired end state/requirement or output (such as output 266)).

Event generators 224 provided by code generators 220 based on device qualification data 210 are configured to send native format events (such as SNMP traps or the like) to the tested software application 250 (such as Sun's Automated Service Manager (SASM)). Other device simulation data (such as event enrichment, time series data, and the like) 228 is used by a set of device simulators (e.g., FMA-based server and/or storage device simulators and so on) 254, which may be provided as script or other code mechanisms to simulate operating devices that are serviced or monitored by application 250 to produce event enrichment for qualification process 200.

The events or event injectors 234 are provided to queue and dispatcher service 260 for delivery to service manager or monitoring application 250 for processing at 262. For example, a RESTful queue may be used at 260 to provide a message queue for event messages 234 to provide load balancing of event injection/delivery to application 250 running on a computer device linked to a network (with the queue/ dispatcher service 260 accessing the application 250 via the Web or network). At 262, the application 250 being qualified/ tested processes one or more received events from dispatcher service 260, and the application 250 may generate a variety of output 266 such as reports, YES/NO decisions, time series graphs, and the like based upon the processing of the event(s). In some embodiments, the application 250 processes the received events from 234 and provides the output via HTTP or other protocol to a general receiver service 260, which in turn sends it to step 262 for further application-specific processing. In either case, the application specific processing 262 that produces the actual output 266 may vary widely according to the invention such as based on the type of telemetry event receive via 234. For example, when the application 250 is SASM a rules engine may be used to perform the processing 262 and create cases as output while for an application 250 that include power management the output may include a power analysis (e.g., application of a Continuous System Telemetry Harness or other algorithm).

Elements 240 and 266 represent expected and actual outputs of an application or services/features within a tested application or software product based upon pre-defined test cases 238. At 270, the actual output 266 from the application 250 is compared with the expected output 240 to determine if the application or this particular feature acceptably handled the event or test element/portion. For example, the outputs may be numerical and a tolerance may be provided to determine whether the actual output is accurate enough to qualify the application 250 or service of the application 250. The comparison function 270 is customizable in the process 200 (e.g., to vary based on the type of service being tested in qualification process 200) such that the step 270 includes the intelligence to determine which logic it should use to compare actual and expected outputs 266, 240 and say whether the output 266 and functioning of the service 250 is acceptable (e.g., say "YES" or "NO" or the like). At step 280, qualification reports may be provided that indicate whether the application 250 or a feature/function within the application 250 has successfully past the testing 200 provided by processing one or more events 224 and/or 230 in a particular enriched/simulated operating environment 224 and/or 254. The output or reports 280 may include all or portion of the actual outputs 266 such as device audits for a service manager or a power management application 250 running on a computer device or host system (e.g., as may be used/implemented after installation at a customer's facilities).

FIG. 3 illustrates a testing process 300 for a software application (such as an application that provided network-delivered services). The process 300 starts at 310 such as by selecting a software application for testing such as ASM with new services/features, a new power management suite, and so on. Step 310 also may include defining an operating environment or context that is to be simulated within the test such as by defining a data center configuration, a data storage array including software and hardware components, and so on. At step 320, the process 300 includes generating and/or receiving a set of qualification data for use in the testing, and the data may include device operating data that is useful for injecting errors. Device simulation data may also be provided or created at 320 to allow an enriched environment to be created during process 300 such as with device simulators (e.g., simulate devices that operate normally or outside of defined ranges such as operating storage arrays, servers, network devices, and the like).

At 330, a set of code generators are operated to process the qualification data and, based on this processing, output event messages (e.g., XML event message files). The code generators may also operate at 330 to output one or more native protocol event generators, which are typically code that pretends to be a particular device and acts to generate events in protocols of the simulated device (e.g., SNMP may be a native protocol for many managed/serviced devices). At 340, a set of test cases is used to generate and/or determine the expected output of the application (or its services/subroutines) being tested in method 300. For example, an alarm or alert may be expected when a particular event message is received from an operating system (or simulated system in this case), and, at 340, this alarm or alert is identified and/or generated.

At 350, the method 300 includes operating the program/software tool that is being tested to receive and process the event messages output in step 330. The program/tool being tested may generate or determine output based on the events and such output may be affected by enriched environment data from device simulators (e.g., an alert may be issued when an event message is received but only after a device is determined to be operating in a particular manner and so on). At 360, the method 300 continues with comparing the expected and actual output to determine if the actual output is acceptable and, hence, whether the program/tool being tested can be qualified for use with a system or set of devices. For example, the comparison 360 may be used to determine if the program/tool being tested accurately identified component failures and operating faults or provided proper power management or analysis results based on the set of event messages and the simulated operating/environment data provided to the program/tool as compared with test cases in which similar data was manually or otherwise processed to provide standards for qualifying the program/tool.

The steps 320-360 may be repeated to fully test a program/tool by having it process large numbers of event messages and/or simulated environmental data from device simulators. At 380, the method 300 continues with generating a qualification report that may or may not include actual output from the application being qualified. At 390, the method 300 is ended. The method 300 (as well as process 200) may be implemented in system 100 or other test systems, and the method 300 may generally be thought of as being implemented by code devices or software provided on or stored on computer-readable medium that is configured to cause one or more computer devices to perform the described functions or steps shown and described.

For example, the monitoring application may monitor operations of a server or a storage device. The device qualification data may provide data for injecting errors into a monitoring application on portions of the monitored hardware and/or software of the monitored devices. For example, event messages may be created relating to operation of one or more boards (e.g., the CPU board, an expansion board, and so on), a CPU, disks, fan operations, I/O devices, memory managers and hardware such as hard drives, tapes, arrays, and so on, power supplies, system controllers, and numerous other monitored aspects of a system or devices within a system. Test cases for these messages are used to provide desirable or acceptable outputs which may be values within a range or tolerance, particular text, or yes/no or true/false-type answers. The event messages are transmitted to the monitoring application and used to create output (e.g., actual output may be an audit report for the monitored devices) and the output may include information obtained by processing data from simulated devices and/or from native protocol event generators in addition to the generated event messages. The actual output (e.g., a device audit report) may then be compared to the output of the test cases to determine if there are issues with the features/functions of the monitoring application such as when discrepancies are noted in between the two outputs for a particular monitored device or for a particular event message for such a device. This comparison is then used as part of the qualification process for a new feature or service of the application and for correcting operating issues/problems with the tested product.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for qualifying a software application providing a plurality of services over a communications network, comprising:
    operating a computer device communicatively linked to the communications network to provide a software application with a plurality of services;
    providing a qualification system communicatively linked to the communications network, wherein the qualification system comprises a code generator adapted for processing a set of device qualification data defining operations of the computer device and a comparator module;
    generating a set of event messages with the code generator by processing the set of device qualification data;
    processing the set of event messages with the plurality of services provided by the software application to generate a set of output;
    operating another code generator to generate a native protocol event generator based on the set of device qualification data and generating a set of events in a protocol native to at least one of the plurality of services provided by the software application with the native protocol event generator, wherein the at least one of the plurality of services provided by the software application responds to the set of native protocol events by generating a portion of the set of output based on the set of native protocol events;
    comparing the set of output with a set of expected output for the set of event messages with the comparator module; and
    generating a qualification report for the software application based on a result of the comparison.

2. The method of claim 1, wherein the set of expected output comprises output from a set of test cases selected based on the set of event messages generated by the code generator.

3. The method of claim 1, wherein the qualification system further comprises a set of device simulators and the method further comprises generating environment data for a plurality of devices monitored by the plurality of services provided by the software application, wherein the software application processes the environment data during the processing of the set of event messages to generate the set of output.

4. The method of claim 3, wherein the plurality of devices monitored by the plurality of services provided by the software application comprise servers and data storage devices, and wherein the plurality of services provided by the software application are adapted to monitor the plurality of devices by processing telemetry data.

5. The method of claim 1, wherein the comparing of the set of output with the set of expected output comprises determining whether values in the set of output are within a tolerance range from corresponding values in the set of expected output.

6. The method of claim 1, wherein the qualification report comprises at least a portion of the set of output from the plurality of services provided by the software application.

7. The method of claim 1, wherein the plurality of services provided by the software application comprise fault management or power management services for servers and data storage devices.

8. A computer system for automating qualification testing of a network-based monitoring application, comprising:
    a computer system implemented with a processor and a communications interface linked with a communications network;
    a set of code generators running on the computer system and generating a set of event messages by processing a set of device qualification data defining operations of the computer system, wherein the communications interface operates to transmit the set of event messages to the network-based monitoring application, wherein the set of code generators generate native protocol event generators based on the set of device qualification data, and wherein the native protocol event generators operate to generate a set of events in a native protocol and provide the set of native protocol events to the network-based monitoring application for use in generating a set of output; and
    a comparator module running on the computer system and comparing a set of expected output for the set of event messages to the set of output generated by the network-based monitoring application based on processing of the set of event messages, wherein the comparator module generates a qualification report for the network-based monitoring application based on a result of the comparison.

9. The computer system of claim 8, wherein the set of expected output comprises output from a set of predefined set of unit test cases processing a set of events associated with the set of event messages.

10. The computer system of claim 8, wherein the set of event messages are generated based on the set of code generators processing the set of device qualification data.

11. The computer system of claim 10, further comprising a set of device simulators running on the computer system and operating to simulate operations of a plurality of computer and data storage devices including outputting operating data for the simulated plurality of computer and data storage devices, wherein the operating data is transmitted to the network-based monitoring application for use in generating the set of output.

12. The computer system of claim 11, wherein the set of device qualification data comprises data indicating one or more of the simulated plurality of computer and data storage devices is operating outside a predefined operating range, whereby the set of device qualification data is adapted for injecting errors when processed by a monitoring product.

13. A computer program product including a non-transitory computer useable medium with computer readable code embodied on the non-transitory computer useable medium, the computer readable code comprising:
    computer readable program code devices configured to cause a computer to effect receiving a set of device qualification data defining operations of a set of computer and storage devices;
    computer readable program code devices configured to cause the computer to effect processing the set of device qualification data to generate a set of event messages for the set of computer and storage devices;
    computer readable program code devices configured to cause the computer to effect retrieving a set of output from a set of test cases selected for monitoring operations of the set of computer and storage devices including monitoring a set of events associated with the set of event messages;
    computer readable program code devices configured to cause the computer to effect generating a set of native protocol event generators operating to transmit a set of events in a native protocol based on the set of device qualification data to a monitoring application; and computer readable program code devices configured to cause the computer to effect qualifying the monitoring application by comparing a set of output from the monitoring application based on processing of the set of event messages with the retrieved set of output from the set of test cases, wherein the qualifying comprises generating a qualification report comprising device audits for the set of computer and storage devices performed by the monitoring application.

14. The computer program product of claim 13, further comprising computer readable program code devices configured to cause the computer to effect simulating at least a portion of the set of computer and storage devices and transmitting operating environment data based on the simulating to the monitoring application.

15. The computer program product of claim 13, wherein the qualifying comprises determining whether at least a portion of the set of output from the monitoring application is within a predefined tolerance range relative to the retrieved set of output from the set of test cases.

16. The computer program product of claim 13, wherein the set of event messages are placed on a queue and transmitted by a dispatcher service to the monitoring application in a time pattern simulating operation of a data center.

* * * * *